United States Patent
Mech

(10) Patent No.: US 9,199,414 B2
(45) Date of Patent: Dec. 1, 2015

(54) OFFSET 3D PRINTING

(71) Applicant: Adobe Systems Incorporated, San Jose, CA (US)

(72) Inventor: Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 70 days.

(21) Appl. No.: 13/868,869

(22) Filed: Apr. 23, 2013

(65) Prior Publication Data

US 2014/0311651 A1    Oct. 23, 2014

(51) Int. Cl.
*B29C 67/00* (2006.01)
*G05B 19/4099* (2006.01)

(52) U.S. Cl.
CPC ......... *B29C 67/0055* (2013.01); *B29C 67/0051* (2013.01); *B29C 67/0085* (2013.01); *B29C 67/0088* (2013.01); *G05B 19/4099* (2013.01)

(58) Field of Classification Search
CPC ........... B29C 67/0051; B29C 67/0055; B29C 67/0085; B29C 67/0088; G05B 19/4099
USPC ............ 156/64, 244.11; 264/176.1, 308; 700/98, 118, 119
See application file for complete search history.

(56) References Cited

U.S. PATENT DOCUMENTS

| | | | |
|---|---|---|---|
| 5,303,141 A * | 4/1994 | Batchelder et al. | 700/29 |
| 5,653,925 A * | 8/1997 | Batchelder | 264/113 |
| 2007/0179657 A1* | 8/2007 | Holzwarth | 700/119 |
| 2011/0202142 A1* | 8/2011 | Mao et al. | 623/23.72 |
| 2014/0048970 A1* | 2/2014 | Batchelder et al. | 264/129 |
| 2014/0284832 A1* | 9/2014 | Novikov et al. | 264/40.1 |
| 2015/0091200 A1 | 4/2015 | Mech | |

* cited by examiner

*Primary Examiner* — Michael Tolin
(74) *Attorney, Agent, or Firm* — Wolfe-SBMC

(57) ABSTRACT

This document describes techniques and apparatuses for offset three-dimensional (3D) printing. These techniques are capable of creating smoother surfaces and more-accurate structures than many current techniques. In some cases, the techniques provide a first stage of filaments separated by offsets and, at a second stage, provide filaments over these offsets. In so doing, filaments of the second stage partially fill-in these offsets, which can remove steps, increase accuracy, or reduce undesired production artifacts.

20 Claims, 14 Drawing Sheets

OFFSET 3D PRINTING

BACKGROUND

Current techniques for three-dimensional (3D) printing include photopolymerization, granular-materials binding, and fused deposition modeling. In the case of fused deposition modeling, layers of material, such as sugar, plastic, or metal, are extruded, often in the form of small beads that make up strings, also called "filaments." Through extruding layer after layer of these filaments a 3D object is created. These 3D objects can include highly complex designs. In fact, almost anything that a computer can model a fused deposition printer can create, from candy art, to a plastic chair, to a metal sculpture.

Current fused deposition modeling techniques, however, often fail to produce highly smooth surfaces. This is due to the size of the filaments. When a change is made from one layer to another layer, a "step" is created that is about the size of the filament's cross-section. These steps can appear as lines or ridges, which limits both the accuracy and the aesthetics of 3D objects created through fused deposition techniques.

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for offset three-dimensional (3D) printing. These techniques are capable of creating smoother surfaces and more-accurate structures than many current techniques. In some cases, the techniques provide a first stage of filaments separated by offsets and, at a second stage, provide filaments over these offsets. In so doing, filaments of the second stage partially fill-in these offsets, which can remove steps, increase accuracy, or reduce undesired production artifacts.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques and apparatuses for three-dimensional (3D) printing often result in stepped surfaces or other undesired production artifacts. This disclosure describes techniques and apparatuses capable of creating smoother surfaces, more-accurate structures, or reducing other undesired production artifacts.

The following discussion describes an operating environment, techniques that may be employed in the operating environment, and a System-on-Chip (SoC) in which component(s) of the operating environment can be embodied. In the discussion below, reference is made to the operating environment by way of example only.

Operating Environment

Figure 1:
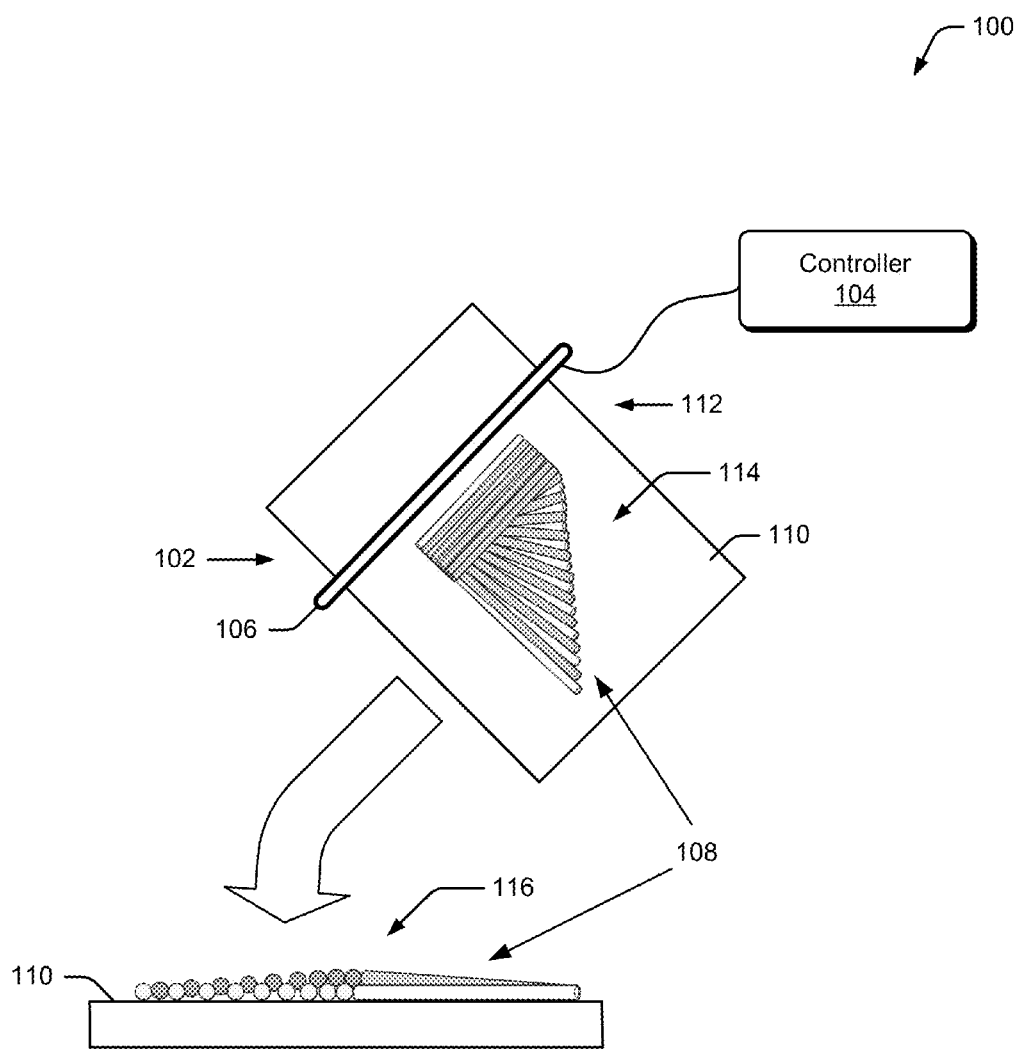
FIG. 1 illustrates an operating environment having a 3D printing device, a controller, and a filament-providing element building a 3D object.

FIG. 1 illustrates an operating environment 100 that includes a 3D printing device 102 having a controller 104 and a filament-providing element 106. 3D printing device 102 is capable of building a 3D object 108, shown built over a support structure 110. Here support structure 110 remains fixed while filament-providing element 106 is mechanically advanced, though filament-providing element 106 may instead be moved and support structure 110 remain fixed (or both may move). 3D printing device 102 optionally includes sensors 112, which are capable of measuring 3D object 108, such as filament locations, angles, and widths.

FIG. 1 also illustrates 3D object 108 from two perspectives, a plan perspective 114 (looking from above) and a side perspective 116. Plan perspective 114 illustrates filaments applied to build 3D object 108, with white filaments provided in a first stage and grey filaments provided over the white filaments as part of a second stage. Side perspective 116 shows 3D object 108 from a side (not a cross section), and illustrates two of the many ways in which the techniques may build smooth surfaces, which will be described in greater detail below.

Figure 2:
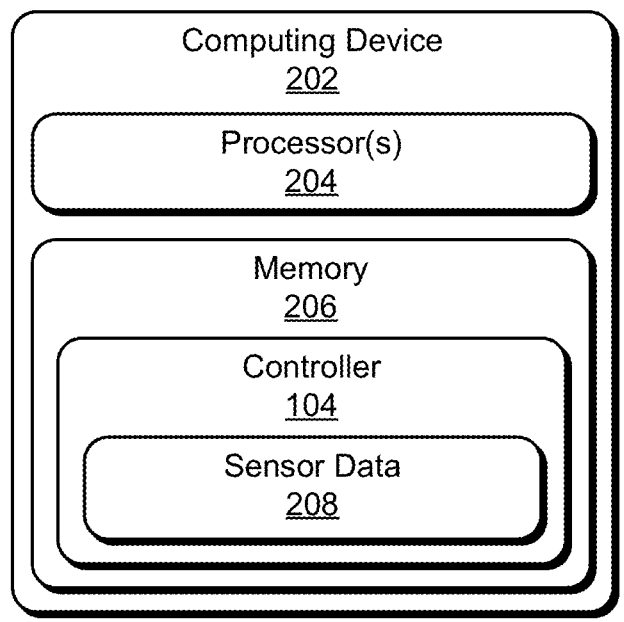
FIG. 2 illustrates a computing device having the controller of FIG. 1.

FIG. 2 is an illustration of a computing device 202 having an example embodiment of controller 104. Computing device 202 includes one or more processors 204 and computer-readable storage memory ("memory") 206. Memory 206 includes controller 104, which includes or has access to sensor data 208 (from sensors 112 of FIG. 1). As noted in part, controller 104 can control, and/or process data from, 3D printing device 102 effective to perform 3D offset printing. In this example embodiment, controller 104 acts through control of filament-providing element 106 to perform 3D offset printing.

Controller 104, in some examples, is capable of causing 3D printing device 102 to provide non-parallel filaments with offsets of the non-parallel filaments separated by progressive offsets separating neighboring non-parallel filaments. These progressive offsets progress from a larger separation to a smaller separation or vice versa between neighboring non-parallel filaments.

Controller 104 may also or instead cause 3D printing device 102 to provide parallel filaments having linear offsets separating the parallel filaments. In providing parallel or non-parallel filaments, controller 104 may do so in stages, the stages having a contour that may be planar or non-planar. Each of these stages can be applied one after the other, though this is not required. Controller 104, for example, may provide some filaments of a stage, then provide, over these filaments, portions of another stage, and then return to the prior stage and so forth.

Note that, while some filaments are referred to herein as being applied as parallel filaments, the term "parallel" is intended to convey that the parallel filaments are substantially parallel. Thus, some parallel filaments can be exactly parallel while others are within as much as about 10 degrees of exactly parallel, while some others are within about 5 degrees of exactly parallel. Therefore, the term "parallel" as used herein means within 0 to about 10 degrees of exact parallel. Non-parallel filaments can be nearly parallel or substantially non-parallel, and thus from about perpendicular (90%) from parallel to as few as a couple of degrees from parallel. In some cases, for example, progressive offsets can be used to provide a long transition from a contour of one stage to a contour of the next stage, such that the first stage includes non-parallel filaments being as few as a couple of degrees from parallel.

After providing these non-parallel or parallel filaments, controller 104 may cause 3D printing device 102 to provide, over the offsets (whether progressive or linear), another stage of filaments. As noted in part above, these filaments can be provided at the offsets and fill in, in whole or in part, these offsets.

Controller 104 optionally may also provide filaments at varying thicknesses, such as by causing filament-providing element 106 to speed up or slow down application of filaments. Further, filament-providing element 106 may be capable of heating material being extruded, thereby also enable controller 104 to cause filament characteristics to be altered, including on the fly. These characteristics may include thickness/thinness, viscosity, and stiffness. By altering characteristics of the filament, controller 104 may control how deep into an offset a filament sinks or is molded into the offset's space and/or how high in the offset the filament body protrudes. This can affect structural strength of 3D object 108, smoothness of structures (e.g., ramps, peaks, and so forth). Further, this control by controller 104 can be on-the-fly, such as based on sensor data 208 from sensors 112, thereby providing a feedback loop as to a smoothness or structural soundness resulting from currently applied filaments.

Filament-providing element 106, may extrude filaments, such as continuously or with closely-spaced beads that, when placed, adhere to each other to create filaments. Filaments, however, are not necessarily extruded. Other manners of printing material may be used, including applying previously created filaments, such as from a spool of filament, as well as other manners known in the art for applying materials in 3D printing. Whether or not extruded, filament-providing element 106 can provide filaments having various cross-sections, such as circular, elliptical, and rectangular, to name but a few. These cross-sections can affect offsets, structures, and smoothness of 3D object 108.

Controller 104 also causes filament-providing element 106 to place filaments at a precision greater than a width of the filaments in at least one dimension. In one example, assume that each stage of printing is performed in a [X,Y] plane, with each additional stage altering a Z dimension, in which case this precision is in the X or Y dimension. This precision can also operate in two or even all three of these dimensions, however, such as with stages of filaments provided in non-planar contours, offsets provided at angles relative to neighboring filaments, or filaments applied in curved shapes within a planar or non-planar stage. These examples are described below.

Ways in which entities of FIGS. 1 and 2 act and interact are set forth in greater detail below. The entities illustrated can be separate or integrated to the extent permitted by the techniques described herein. While controller 104 is shown as computer-executable instructions executable by processor(s) 204, it may instead be hardware or firmware, or a combination of hardware, firmware, and/or software.

Example Techniques for Offset 3D Printing

The following discussion describes example techniques for offset 3D printing. These techniques can be implemented utilizing the previously described environment, such as controller 104 of FIG. 1. These techniques include methods illustrated in FIGS. 3 and 7, each of which is shown as a set of operations performed by one or more entities. These methods are not necessarily limited to the orders shown for performing the operations, and can be performed together or separate in whole or in part.

Figure 3:
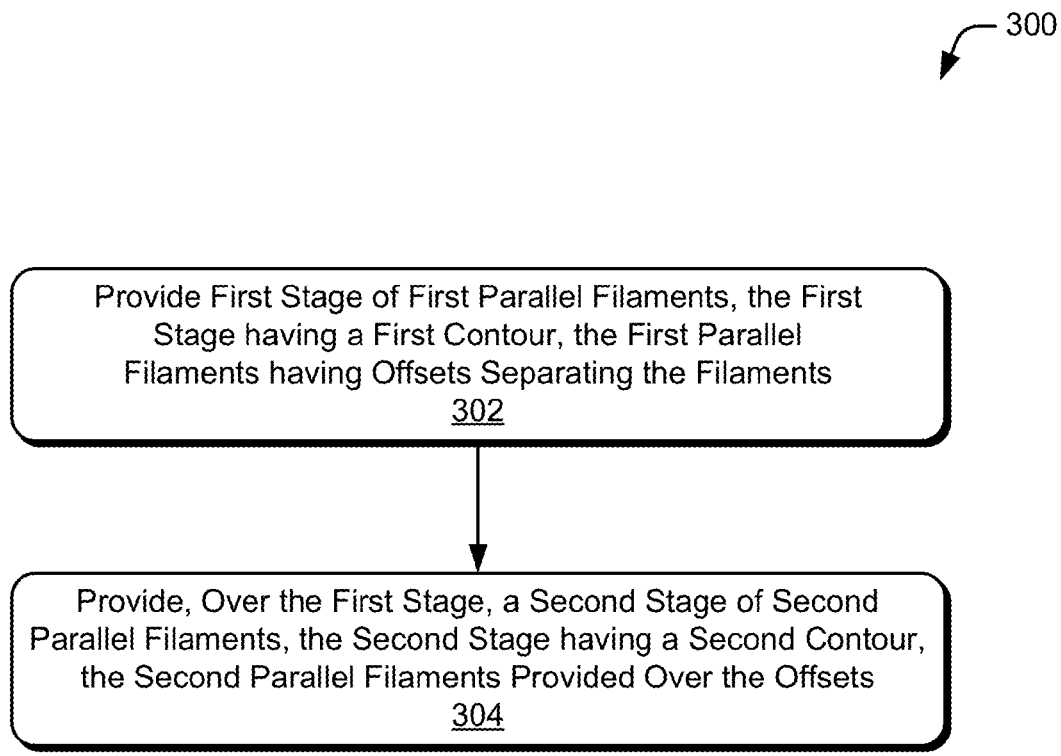
FIG. 3 illustrates an example method for offset 3D printing with offsets separating parallel filaments.

FIG. 3 depicts methods 300 for offset 3D printing. These methods 300 provide offsets separating parallel filaments.

At 302, a stage of parallel filaments is provided. These parallel filaments 402 are provided having offsets separating the parallel filaments. This is illustrated in plan and cross-sectional views in FIG. 4. A stage 404 is shown in plan view at 404-1 and in cross-section view (along line 406) at 404-2. Note that stage 404 includes offsets 408 and is provided having a contour 410, which is a plane in the X and Y dimension (the Z dimension is also shown) that intersects a top-most portion of parallel filaments 402.

Figure 4:
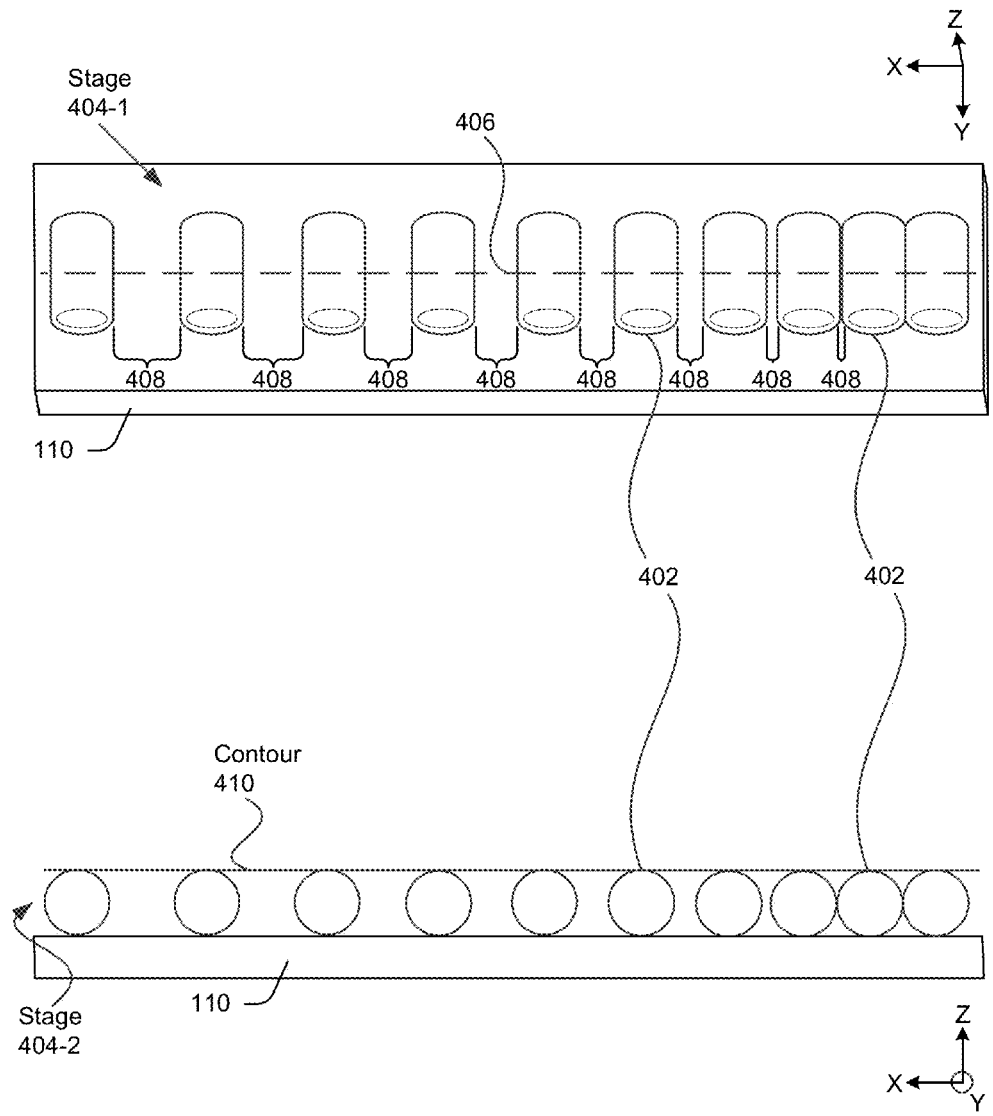
FIG. 4 illustrates a stage of parallel filaments having offsets separating the parallel filaments. This stage is illustrated in plan and cross-sectional views.

These offsets 408 can proceed from larger offset widths to smaller offset widths, which is effective to cause the parallel filaments placed over larger offsets to be closer to contour 410 than parallel filaments placed over the smaller offsets. In FIG. 4, offsets 408 are shown to vary from about as wide as a filament to nearly zero.

Figure 5:
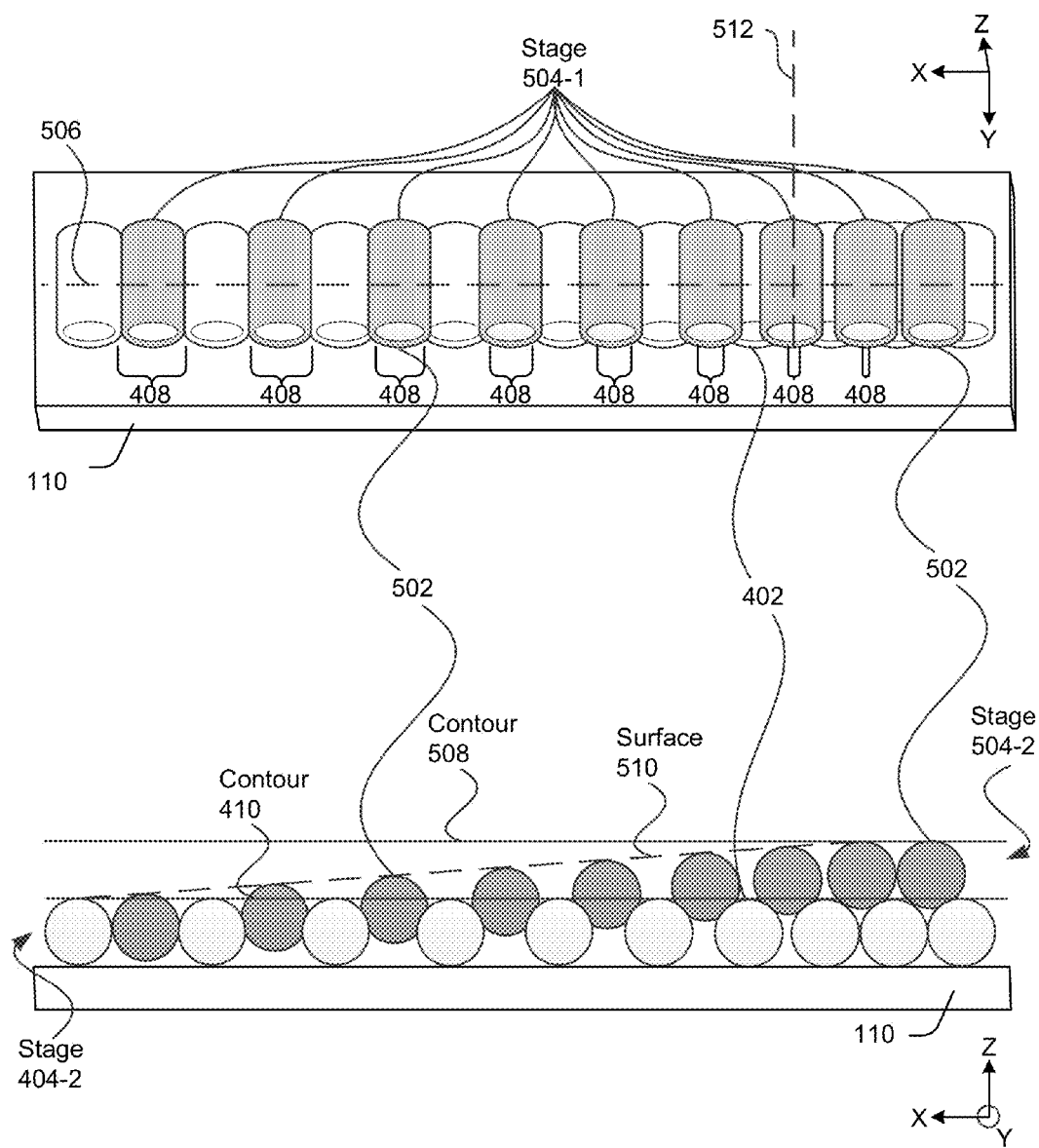
FIG. 5 illustrates another stage of parallel filaments, this other stage provided over the offsets of the first stage of parallel filaments shown in FIG. 4. This other stage is illustrated in plan and cross-sectional views.

At 304, another stage of parallel filaments is provided over the offsets of the first stage of parallel filaments. This is illustrated, as part of the ongoing example, in FIG. 5. FIG. 5 shows elements of FIG. 4, including stage 404 and contour 410, along with parallel filaments 502 of stage 504. Stage 504 is shown in plan view at 504-1 and in cross section view at 504-2 (along line 506). Stage 504 has a contour 508, which is also a plane in the X and Y dimension, though located about a filament widths' higher in the Z dimension than contour

410. Note that a top edge of parallel filaments 502 of stage 504 resides in between contour 410 and contour 508. This is effective to provide a smooth surface 510, which progressively moves from contour 410 to contour 508.

While not required, at 304 controller 104 may cause filament-providing element 106 to provide parallel filaments 502 at a midline 512 of offsets 408 (one of these midlines is shown in FIG. 5). This provision at midlines is illustrated in FIG. 5, though methods 300 may instead provide filaments off-centered from the midline. Filaments, depending on their material characteristics, may be drawn into, fall into, or be propelled into the offsets and thus a high degree of precision may not be necessary. Furthermore, even if a filament is not fully centered at a midline of an offset, smoother surfaces and higher accuracy may still result from use of the techniques.

As noted in part above, contours of the stages (e.g., contour 410 and contour 508) can be planar. In many cases, however, a stage having offsets is applied over a non-planar prior stage, object, or support structure and thus is not planar. A next stage applied over the prior stage having offsets is thus also not planar.

Whether the prior surface (and thus the stage having offset filaments) is planar or otherwise, controller 104 may provide parallel filaments 502 in a plane and the filaments then fall into or are drawn into the offsets. Thus, controller 104 in some cases can provide filaments in each stage without movement in the Y direction, as some non-planar surfaces are still relatively flat, thereby enabling provided filaments to conform even when applied at some distance over the non-planar surface. For example, a non-planar surface that varies from a lowest to highest point of 5 millimeters, can, depending on characteristics of the filaments, be applied at about 5 millimeters from a flat plane. This means that some filaments "fall" or are drawn to the non-planar surface from a distance in the Z dimension of as little as 0.05 millimeters while others are from as much as 5 millimeters.

Further, again whether the prior surface is planar or otherwise, controller 104 may provide parallel filaments 502 at intra-stage levels when filament-providing element 106 is capable of a precision in the Z dimension that is better than a filament width. In other words, parallel filaments 502 can be provided at or near an intended final location of the filaments, and thus at varying distances between contour 410 and contour 508, such as at about surface 510 of FIG. 5 or over the example non-planar surface with a consistent application of 0.3 millimeters over a surface varying from a lowest to highest point from zero to five millimeters.

As noted in part above, in some cases the techniques can provide thinner or thicker filaments, such as thinner filaments over smaller offsets and thicker filaments over larger offsets. In some cases, application of thinner or thicker filaments is responsive to sensor data 208 from sensors 112. Assume, for example, that sensors 112 provide a conformity value indicating an amount at which one of parallel filaments 502 of stage 504 conforms to, or "sinks into," one of offsets 408. In response to parallel filaments 502 not sufficiently conforming, or conforming more than expected into offsets 408 provided at stage 404, controller 104 may alter a characteristic of not-yet-applied parallel filaments 502 during provision of stage 504.

Figure 6:
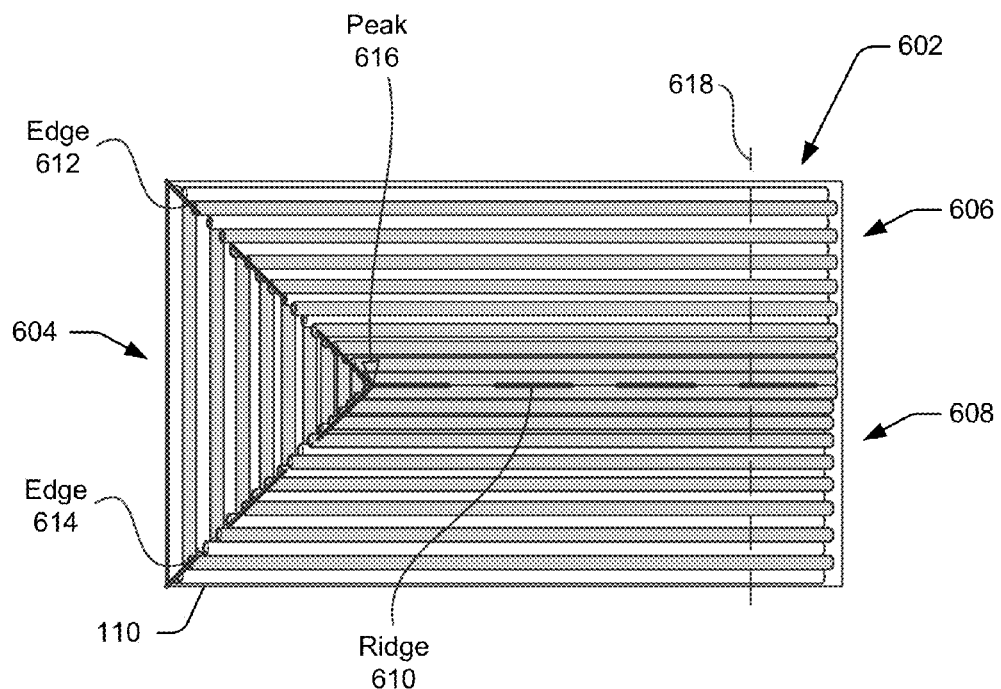
FIG. 6 illustrates a 3D object having a triangular portion and two non-symmetrical polygons with filaments rising to a ridge.
Figure 6:
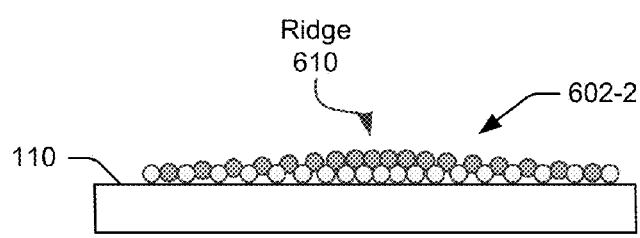

The ongoing example of FIGS. 4 and 5 describe surface 510 having a smooth ramp from contour 410 to contour 508. The described techniques, however, can produce arbitrary surfaces using methods 300 and/or methods 700 described below. By way of example, consider a case where a designer wishes to create a 3D object having a high ridge with three portions rising up to the ridge, one being triangular and the others being non-symmetrical polygons. This example is shown in FIG. 6, with 3D object 602 on support structure 110, triangular portion 604, first non-symmetrical polygon 606, and second non-symmetrical polygon 608. Note that each of these portions has a first and a second stage of parallel filaments rising to ridge 610. Object 602 also includes edges 612 and 614 that rise up to peak 616 of ridge 610. A cross-section view 602-2 across line 618 is also shown in FIG. 6. This is but one example intended to show that the techniques can provide arbitrary structures and surfaces, others are described and contemplated herein.

Figure 7:
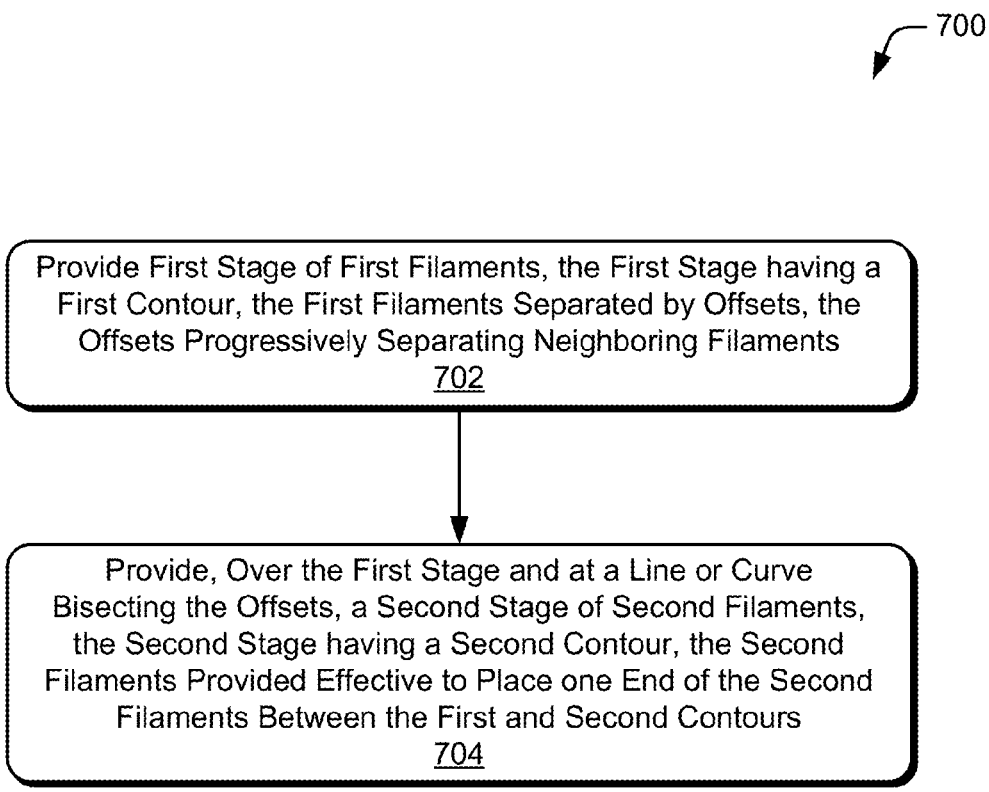
FIG. 7 illustrates an example method for offset 3D printing with offsets progressively separating non-parallel filaments.

FIG. 7 depicts methods 700 for offset 3D printing with offsets progressively separating non-parallel filaments.

At 702, a stage of non-parallel filaments is provided. These non-parallel filaments are provided with offsets separating neighboring non-parallel filaments, which can progress to or from a larger separation to a smaller separation.

Figure 8:
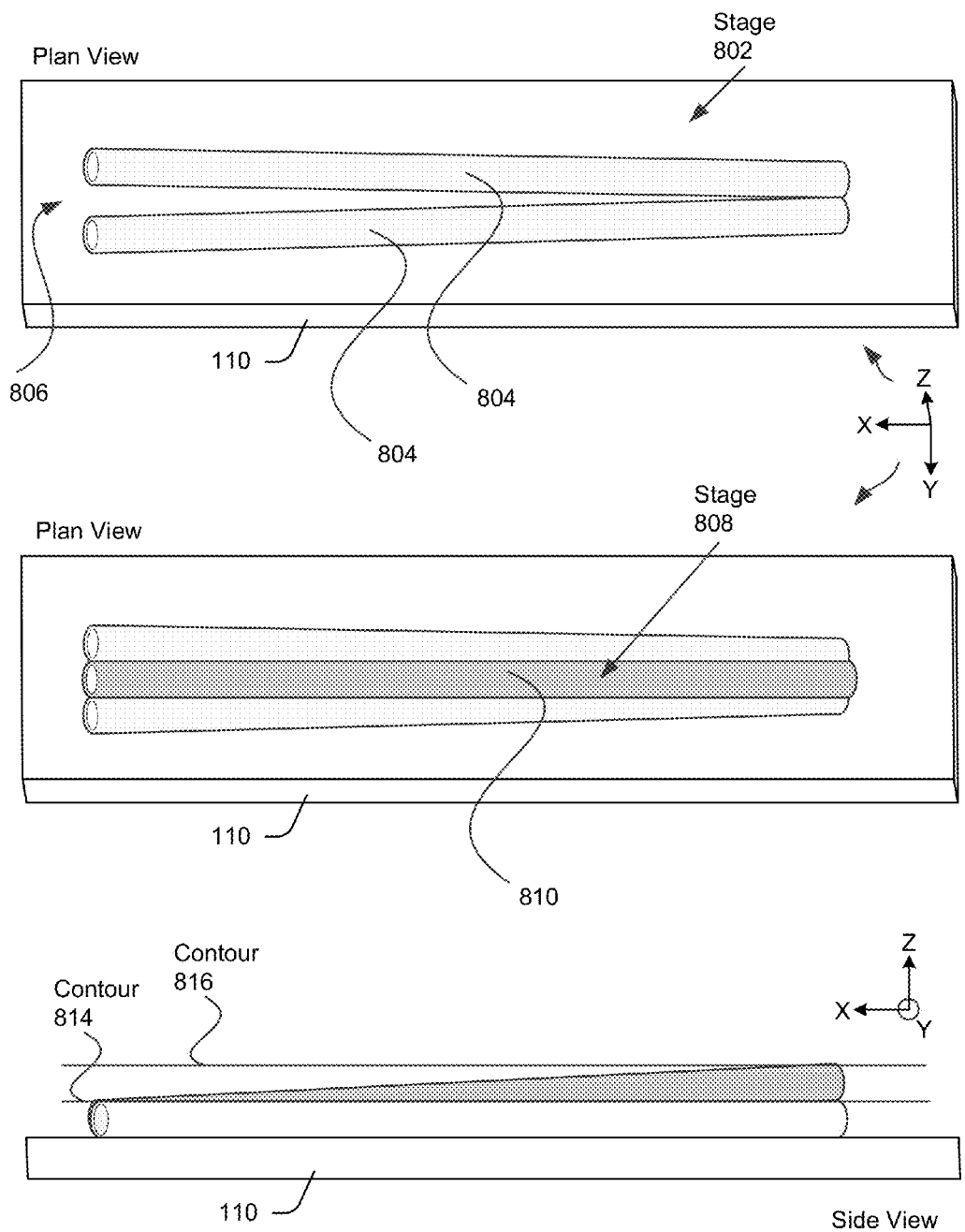
FIG. 8 illustrates a stage having two non-parallel filaments with an offset separating these filaments and another stage with a filament in this offset.

By way of example, consider FIG. 8, which illustrates a stage 802 having two non-parallel filaments 804 with an offset 806 separating these filaments, all provided over support structure 110.

At 704, non-parallel filaments of another stage are provided over offsets of the prior stage. These non-parallel filaments can be provided over a line or curve bisecting each of the offsets, though this precision is not necessarily required. This stage, like the prior stage provided at 702, can have various planar or non-planar contours, such as when the prior stage is applied over a non-planar prior stage or object, in which case the prior stage provided at 704 provides non-parallel filaments over the non-planar contour of the previous stage or object.

Whether planar or otherwise, filaments provided at 704 can be provided within that contour (e.g., through filament-providing element 106 when capable of intra-level precision in the Z dimension) or within a plane such that filaments falling into, propelled into, or drawn into, the offsets as noted in detail above.

Continuing the ongoing example of FIG. 8, controller 104 provides another stage 808 over stage 802, this other stage 808 having one non-parallel filament 810 (for visual brevity) provided over this offset 806. Offset 806 begins at a width of about that of non-parallel filaments 804 and 810 and ends at a zero width (non-parallel filaments 804 touch at one end). A side view of both stages 802 and 808 is shown to illustrate contour 814 of stage 802 and contour 816 of stage 808. Note that non-parallel filament 810 provides a surface rising gradually and consistently from contour 814 to 816. In this illustrated example, controller 104 provides non-parallel filament 810 in a line bisecting offset 806, though exact precision in bisecting the offset is not required. For additional illustration, consider FIG. 9, which shows six cross-section views 900 of stages 802 and 808 of FIG. 8. These cross-section views 900 illustrate the location of non-parallel filament 810 in the Z dimension relative to contour 816.

Figure 9:
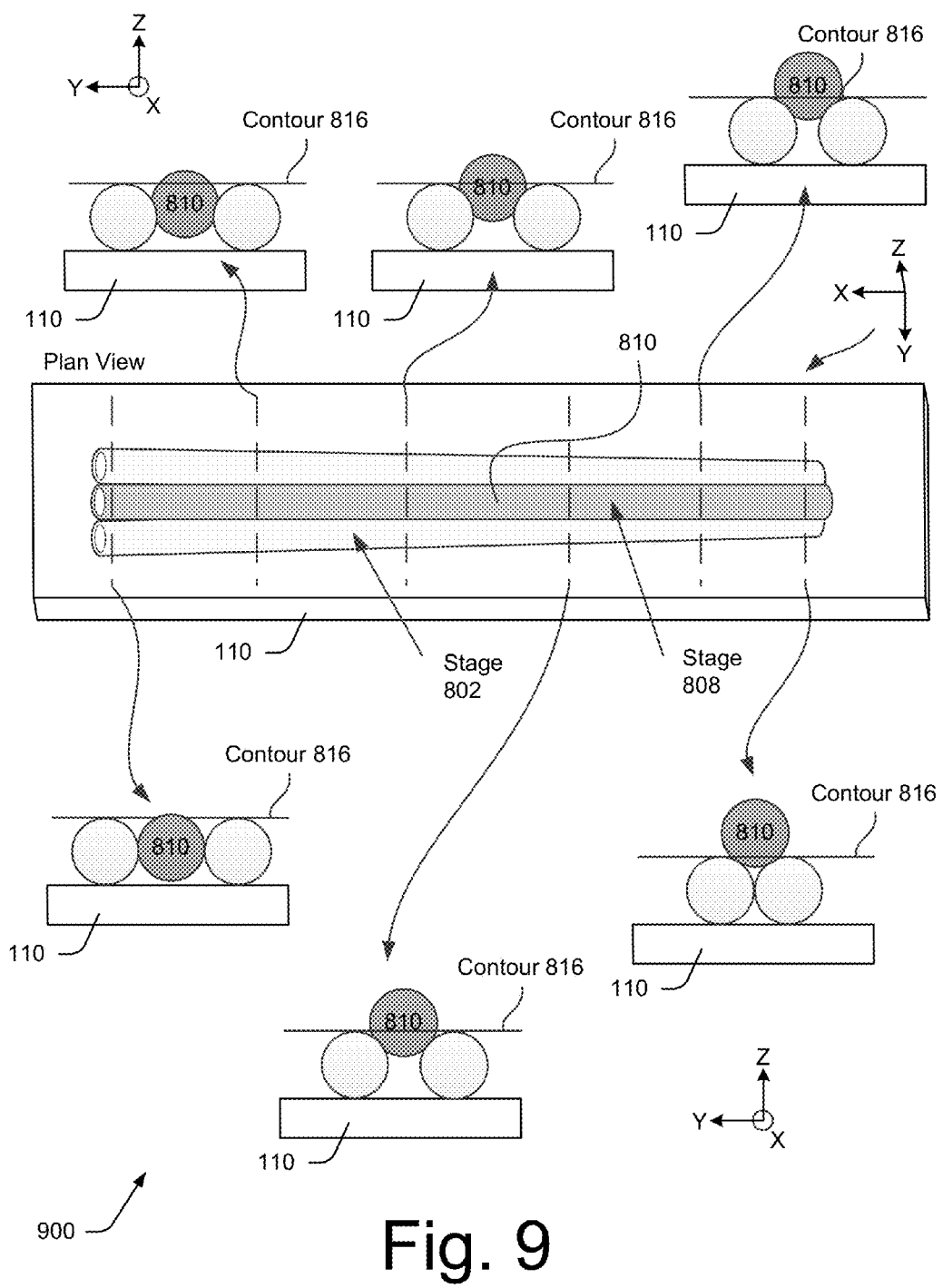
FIG. 9 illustrates cross-section views of the stages of FIG. 8.
Figure 10:
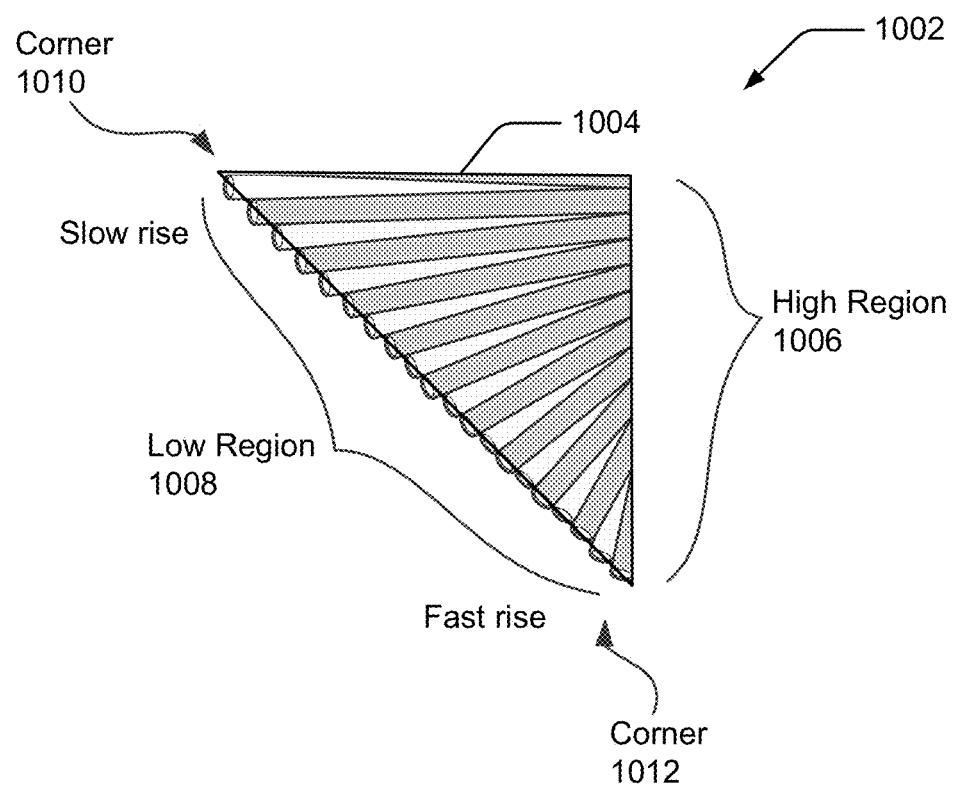
FIG. 10 illustrates a 3D object having a triangular portion with a high region opposite a low region with varying rates of rise.

The example illustrated in FIGS. 8 and 9 show three filaments in two stages for visual brevity. Stages provided by methods 700, however, can be used to build numerous surfaces and structures. Consider, for example, FIG. 10, which illustrates a 3D object 1002 having a triangular portion 1004 with a high region 1006 opposite a low region 1008, low region 1008 having corners 1010 and 1012. Note that the rate of rise from corner 1010 of low region 1008 to high region 1006 is slow relative to the rate of rise from corner 1012 of low region 1008 to high region 1006. Thus, the techniques can build a structure having a smooth surface and a varying rate of rise for various portions of the 3D object. Similarly, a 3D object may have a consistent or varying rate of rise to an apex (rather than the linear edge of high region 1006), such as with a fan-shaped portion with a consistent rate of rise to an apex region. The outer edge can be linear, polygon, arced, and forth. These are but two examples of the many structures and surfaces enabled by the techniques.

Figure 11:
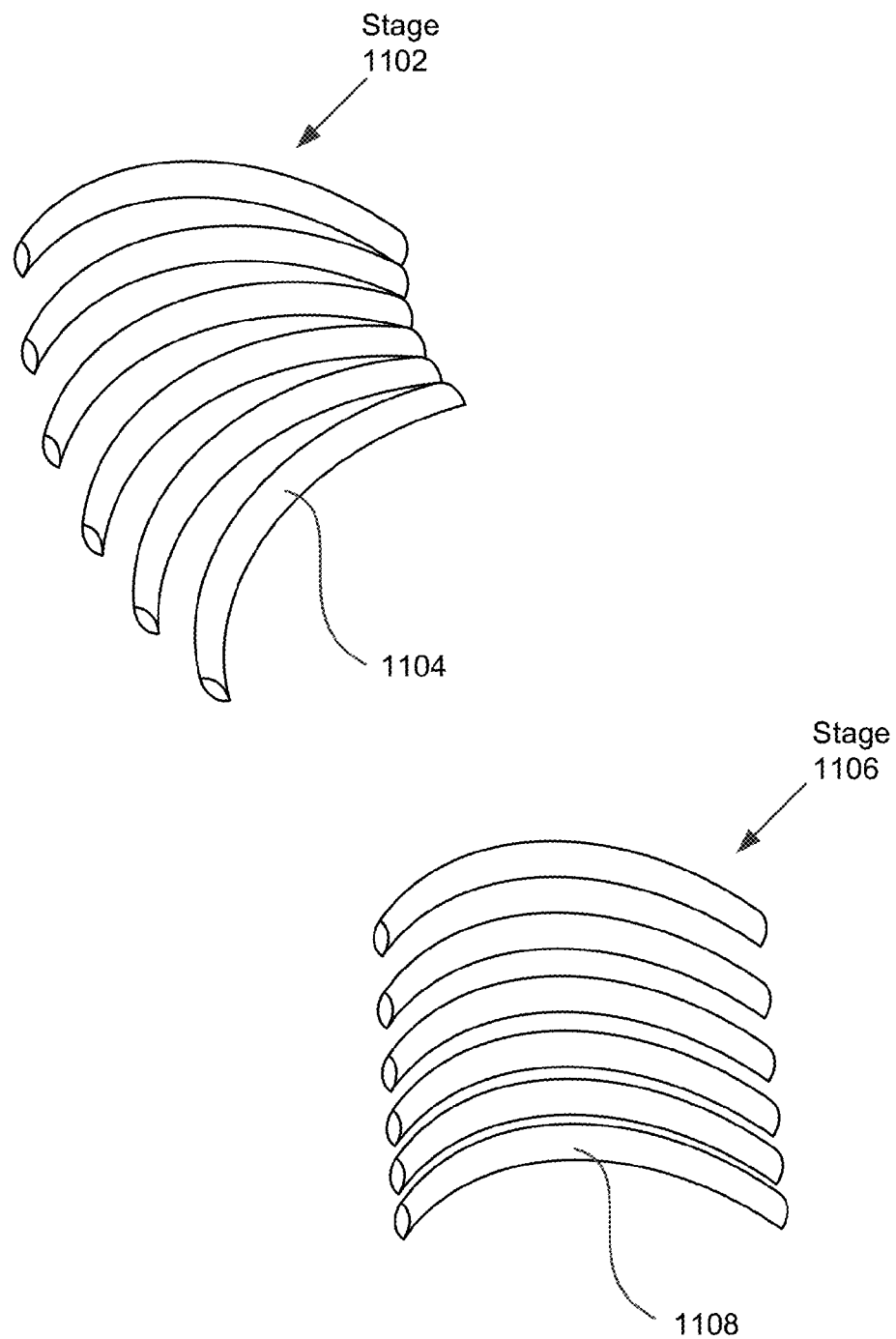
FIG. 11 illustrates a stage of non-parallel non-linear filaments having offsets between neighboring filaments and another stage having parallel non-linear filaments having offsets.

While illustrated above with various linear filaments, methods 300 and 700 may provide filaments that are non-linear. Consider, for example, FIG. 11, which illustrates a stage 1102 having non-parallel non-linear filaments 1104 having offsets between neighboring of the non-parallel non-linear filaments 1104. FIG. 11 also illustrates a stage 1106 having parallel non-linear filaments 1108 with each offset having a non-varying size—each offset, however, may have a different width than each other offset. As can be imagined from these stages, many non-planar and non-linear surfaces and structures are enabled by the techniques. Consider, for example, a case where a designer wishes to build an object having a point rising from an arbitrary, elliptical, or circular foundation. The techniques enable such a structure, including through use of non-linear filaments having offsets.

Consider a case where a designer wishes to build an object having many non-planar surfaces. One of these surfaces is illustrated in cross-section in FIG. 12, which shows a concave, non-planar surface 1202 between two planar contours 1204 and 1206. Planar contour 1204 is applied in stage 1208 over support structure 110 with offsets spaced sufficient to create, when stage 1210 applies filaments over stage 1208, to create concave, non-planar surface 1202. This concave, non-planar surface 1202 illustrates one of many surfaces enabled by the techniques, such as surfaces that are irregular, non-planar, convex, concave, and so forth.

Figure 12:
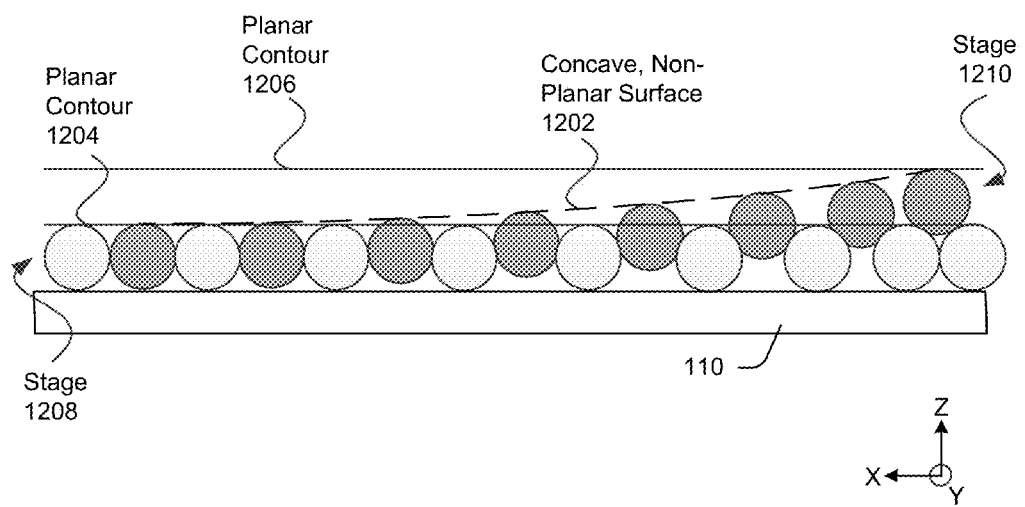
FIG. 12 illustrates two stages having planar contours where the techniques create a concave, non-planar surface between the two planar contours.
Figure 13:
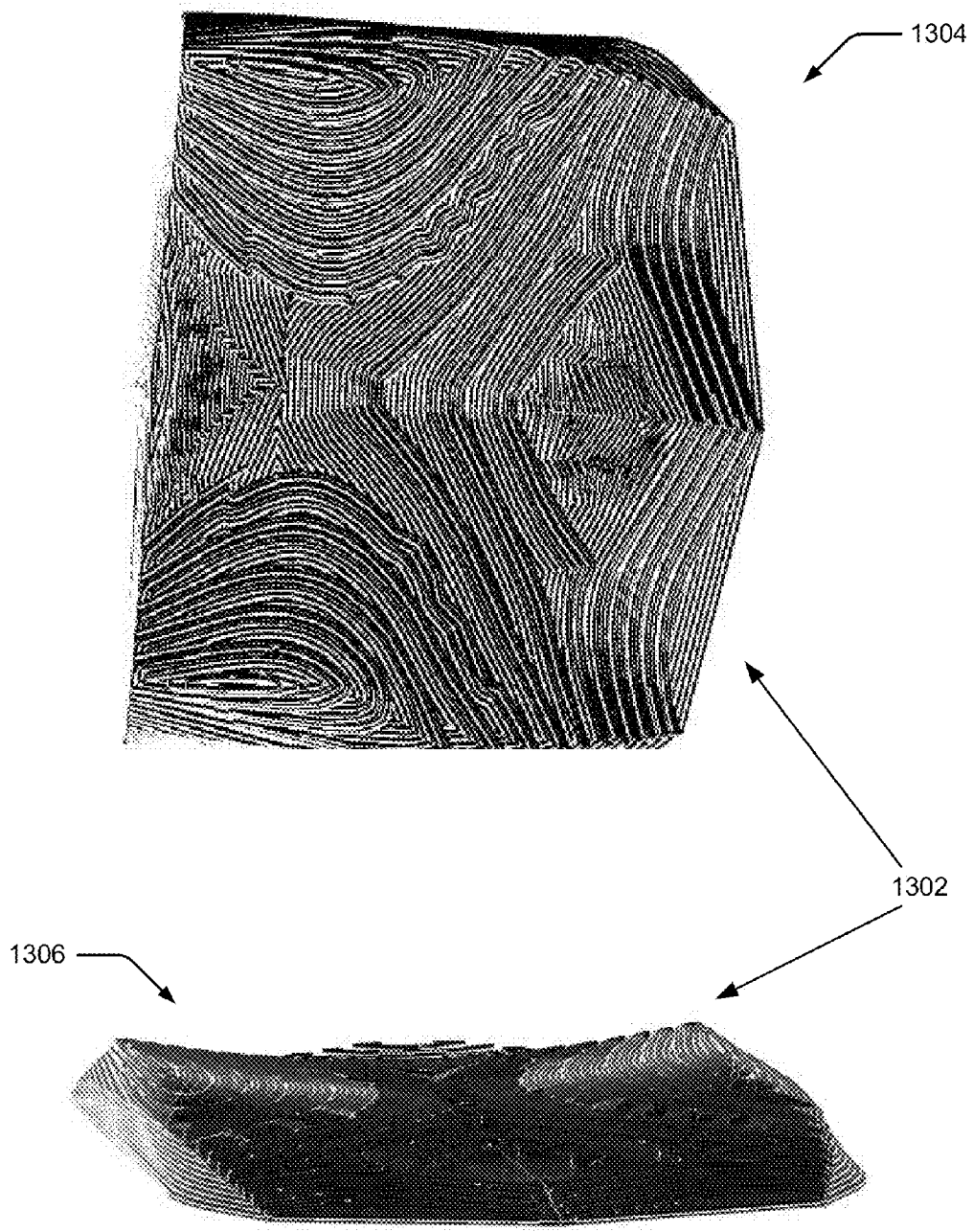
FIG. 13 illustrates a car hood created using the techniques, shown with top and front views.

While simplified in FIG. 12 for visual clarity, a surface can be created rising to a point, ridge, or otherwise, and from an arbitrary, elliptical, or circular foundation. The techniques enable such a structure, including through use of non-linear filaments having offsets. In more complexity, consider FIG. 13, which illustrates two views of a car hood 1302 created using the techniques, shown at top view 1304 and front view 1306. This car hood 1302 is built using a combination of non-linear filaments and linear filaments, both in parallel and not in parallel. In so doing, planar and non-planar surfaces are created both between stages and through application of many stages.

For visual simplicity, the above illustrations show filaments as long strings or columns with circular cross sections. These filaments, however, may have other structures, or be softened, filled into an offset, or be subject to later processing thereby altering their structure (e.g., sintering ceramic filaments to improve strength). Whether idealized as long columns with circular cross sections or otherwise, the techniques are capable of building 3D objects with smooth surfaces or accurate structures using offset 3D printing.

System-on-Chip

Figure 14:
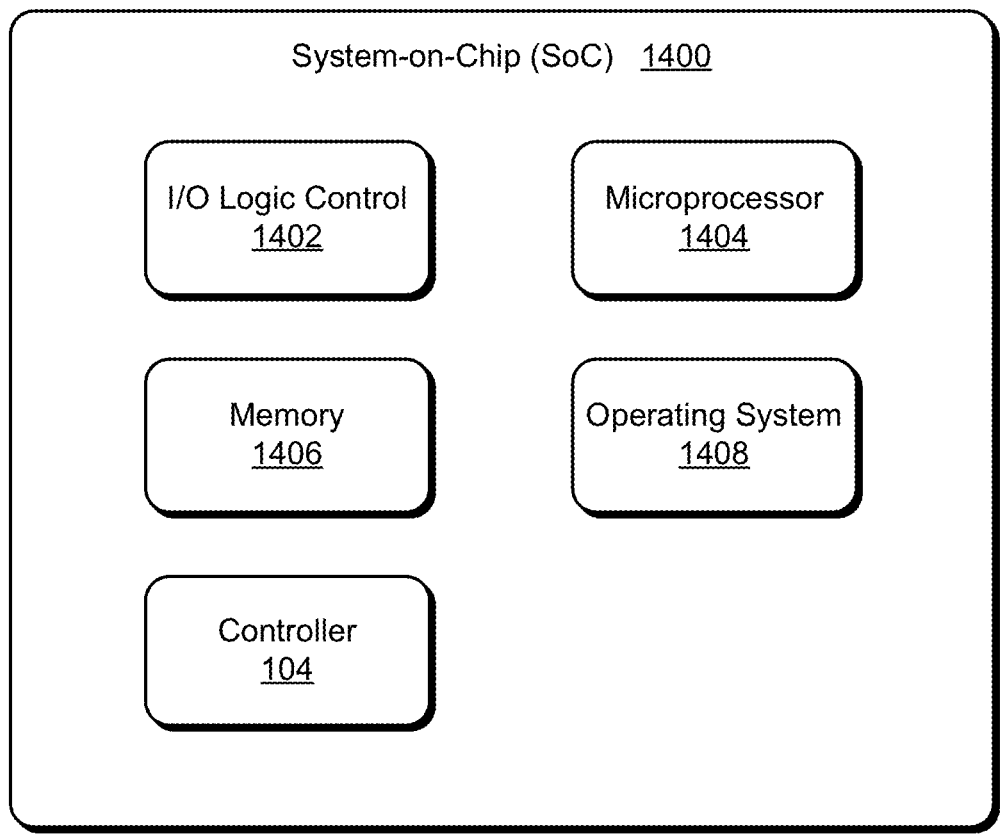
FIG. 14 illustrates a System-on-Chip (SoC) environment for implementing embodiments of the techniques described herein.

FIG. 14 illustrates a System-on-Chip (SoC) 1400, which can implement various embodiments described above. An SoC can be implemented in a fixed or mobile device of various types. SoC 1400 can be integrated with electronic circuitry, a microprocessor, memory, input-output (I/O) logic control, communication interfaces and components, other hardware, firmware, and/or software needed to run an entire device (e.g., 3D printing device 102). SoC 1400 can also include an integrated data bus (not shown) that couples the various components of the SoC for data communication between the components. A device that includes SoC 1400 can also be implemented with many combinations of differing components.

In this example, SoC 1400 includes various components such as an input-output (I/O) logic control 1402 (e.g., to include electronic circuitry) and a microprocessor 1404 (e.g., any of a microcontroller or digital signal processor). SoC 1400 also includes a memory 1406, which can be any type of random access memory (RAM), a low-latency nonvolatile memory (e.g., flash memory), read only memory (ROM), and/or other suitable electronic data storage. SoC 1400 can also include various firmware and/or software, such as an operating system 1408, which can be computer-executable instructions maintained by memory 1406 and executed by microprocessor 1404. SoC 1400 can also include other various communication interfaces and components, wireless LAN (WLAN) or PAN (WPAN) components, other hardware, firmware, and/or software.

SoC 1400 includes controller 104, which may include various components of FIG. 2 as well. Controller 104 in SoC 1400, either independently or in combination with other entities, can be implemented as computer-executable instructions maintained by memory 1406 and executed by microprocessor 1404 to implement various embodiments and/or features described herein, such as offset 3D printing of parallel, non-parallel, curved, and/or linear filaments. Controller 104 may also be provided integral with other entities of the SoC. Alternatively or additionally, controller 104 and the other components can be implemented as hardware, firmware, fixed logic circuitry, or any combination thereof that is implemented in connection with the I/O logic control 1402 and/or other signal processing and control circuits of SoC 1400.

Although the subject matter has been described in language specific to structural features and/or methodological operations, the subject matter defined in the appended claims is not necessarily limited to the specific features or operations described above, including orders in which the operations are performed.

What is claimed is:

1. A method comprising:
   providing a first stage of first parallel filaments, the first stage having a first contour, the first contour being a first plane that interests a top of the first parallel filaments, the first parallel filaments separated by offsets which progress from larger offset widths to smaller offsets widths or smaller offset widths to larger offset widths; and
   providing, over the first stage of first parallel filaments, a second stage of second parallel filaments, the second stage having a second contour, the second contour being a second plane parallel to and located about a filament width higher than the plane of the first contour, the second parallel filaments provided over the offsets effective to place a surface of the second parallel filaments between the first contour of the first stage and the second contour of the second stage, the surface of the second parallel filaments intersecting a top of the second parallel filaments.

2. The method of claim 1, wherein the offsets having larger offset widths to smaller offsets widths or smaller offset widths to larger offset widths is effective to cause the surface of the second parallel filaments to be a smooth surface progressively moving closer to the first contour from the second contour or closer to the second contour from the first contour.

3. The method of claim 2, wherein the larger offset widths are about as wide as a filament width of one of the first parallel filaments and the smaller offset widths are less wide than the filament width of the one of the first parallel filaments.

4. The method of claim 2, wherein providing the second parallel filaments provides thinner filaments over the smaller offset widths than the larger offset widths by altering a viscosity of a filament material being provided or by speeding up a movement of a filament-providing element providing the second parallel filaments.

5. The method of claim 1, wherein the surface is a smooth ramp or a concave, non-planar surface that resides between the first contour and the second contour.

6. The method of claim 5, wherein in the step of providing the second stage, the second parallel filaments fall into, or are drawn into, the offsets.

7. The method of claim 1, wherein providing the second stage provides the second parallel filaments between the first plane and the second plane via a filament-providing element capable of intra-stage leveling.

8. The method of claim 1, further comprising receiving a conformity value from a sensor, the conformity value indicating an amount at which one of the second parallel filaments of the second stage conforms to, or sinks into, the first parallel filaments of the first stage and further comprising, responsive to receiving this conformity value, altering a characteristic of not-yet-applied second parallel filaments during provision of the second stage.

9. The method of claim 1, wherein providing the second stage of the second parallel filaments over the offsets provides the second parallel filaments at a midline of the offsets.

10. A method comprising:
providing a first stage of first non-parallel filaments, the first stage having a first contour, the first contour being a plane intersecting a top of the first non-parallel filaments, the first non-parallel filaments separated by offsets, the offsets separating neighboring first non-parallel filaments, the offsets progressing from a larger separation to a smaller separation or vice versa; and
providing, over the first stage, a second stage of second non-parallel filaments, the second stage having a second contour, the second contour being a plane located about a filament width higher than the plane of the first contour, the second non-parallel filaments provided over the offsets effective to place a region of the second non-parallel filaments between the first contour of the first stage and the second contour of the second stage.

11. The method of claim 10, wherein providing the second non-parallel filaments provides the second non-parallel filaments over a line or curve bisecting each of the offsets.

12. The method of claim 10, wherein the region of the second non-parallel filaments between the first contour and the second contour is a low region opposite a high vertex region, the low region being nearer to the first contour than the high vertex region.

13. The method of claim 10, wherein providing the first stage and the second stage are effective to create an arced lower region at or near the first contour and an apex region at or near the second contour.

14. The method of claim 10, wherein at least some of the first non-parallel filaments are non-linear within the first contour.

15. The method of claim 10, wherein: providing the second stage provides the second non-parallel filaments in the plane of the second contour, the second non-parallel filaments falling into, or drawn into, the offsets effective for a surface intersecting a top of the second non-parallel filaments of the second stage to be placed higher than the plane of the first contour and lower than the plane of the second contour; or providing the second stage provides the second non-parallel filaments between the plane of the first contour and the plane of the second contour via a filament-providing element capable of intra-stage leveling effective for the surface of the second stage of the second non-parallel filaments to reside between the first contour and the second contour.

16. A method comprising:
providing first non-parallel filaments having a contour intersecting a top of the non-parallel filaments, the first non-parallel filaments separated by progressive offsets, the progressive offsets separating neighboring first non-parallel filaments, the progressive offsets progressing from a larger separation to a smaller separation or vice versa;
providing first parallel filaments also having the first contour, the first parallel filaments having linear offsets separating the first parallel filaments;
providing, over a progressive offset separating two neighboring first non-parallel filaments, in contact with the two neighboring first non-parallel filaments, and in alignment with the progressive offset separating the two neighboring first non-parallel filaments, second non-parallel filaments, each of the second non-parallel filaments applied effective to reside at least in part progressively rising through the contour that intersects the top of the first non-parallel filaments; and
providing, over a linear offset separating two neighboring first parallel filaments, in contact with the two neighboring first parallel filaments, and in alignment with the linear offset separating the two neighboring first parallel filaments, a stage of second parallel filaments, the stage of second parallel filaments having a surface that progressively rises through the contour.

17. The method of claim 16, wherein providing the second non-parallel filaments or the second parallel filaments is an operation of the method, and wherein the operation provides a thicker or thinner filament by speeding up or slowing down a filament-providing element.

18. The method of claim 16, further comprising:
extruding a material of which the first and second filaments are made up and applying a thicker or thinner filament by heating or cooling the material during extrusion;
applying closely spaced beads of material, the closely spaced beads, when placed, adhering to create the first filaments or the second filaments; or
applying previously created filaments as the first filaments or the second filaments, the previously created filaments created prior to the provision of the first filaments.

19. The method of claim 16, wherein providing the first parallel or non-parallel filaments or the second parallel or non-parallel filaments provides the filaments in a circular cross-section, an elliptical cross-section, or a rectangular cross-section.

20. The method of claim 16, wherein providing the stage of second parallel filaments over the linear offsets provides the second parallel filaments at lines bisecting the linear offsets.

* * * * *